(12) United States Patent
Newcomb et al.

(10) Patent No.: US 11,472,358 B2
(45) Date of Patent: Oct. 18, 2022

(54) METHOD OF FORMING A UNITARY COMPOSITE STRUCTURE

(71) Applicant: GM Global Technology Operations LLC, Detroit, MI (US)

(72) Inventors: Bradley A. Newcomb, Troy, MI (US); Xiaosong Huang, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 647 days.

(21) Appl. No.: 16/409,265

(22) Filed: May 10, 2019

(65) Prior Publication Data
US 2020/0353883 A1    Nov. 12, 2020

(51) Int. Cl.
| | |
|---|---|
| *B60R 19/26* | (2006.01) |
| *B65B 1/02* | (2006.01) |
| *B60R 19/03* | (2006.01) |
| *B65B 1/24* | (2006.01) |
| *A42B 3/06* | (2006.01) |
| *B29L 31/30* | (2006.01) |
| *B60R 19/02* | (2006.01) |
| *B60R 19/18* | (2006.01) |
| *B60R 19/24* | (2006.01) |

(52) U.S. Cl.
CPC .............. *B60R 19/26* (2013.01); *B60R 19/03* (2013.01); *B65B 1/02* (2013.01); *B65B 1/24* (2013.01); *A42B 3/064* (2013.01); *B29L 2031/3044* (2013.01); *B60R 19/02* (2013.01); *B60R 19/18* (2013.01); *B60R 19/24* (2013.01)

(58) Field of Classification Search
None
See application file for complete search history.

(56) References Cited

U.S. PATENT DOCUMENTS

2020/0198262 A1 *   6/2020  Prause ................. B29C 70/682

FOREIGN PATENT DOCUMENTS

CA           2843930 A1 *  9/2014  ............. B29C 33/02

* cited by examiner

*Primary Examiner* — Joseph S Del Sole
*Assistant Examiner* — Guy F Mongelli
(74) *Attorney, Agent, or Firm* — Quinn IP Law (57) ABSTRACT

A method of manufacturing a unitary energy absorbing structure for a vehicle includes providing a first mold having a cavity receiving a first mandrel and a second mold having a cavity receiving a second mandrel. At least one mandrel segment is positioned in the first mold cavity and cooperates with the first mandrel. One or more layers of composite material at least partially cover the first mold cavity, first mandrel, at least one mandrel segment and second mold. The unitary structure is formed from the first layer, the second layer and the third layer of composite material with the first mandrel, the at least one mandrel segment and the second mandrel in the first mold and the second mold.

19 Claims, 6 Drawing Sheets

METHOD OF FORMING A UNITARY COMPOSITE STRUCTURE

INTRODUCTION

The present disclosure relates generally to a method of forming a unitary composite structure, and more specifically, to a method of forming fiber-reinforced unitary composite energy-absorbing assemblies such as a unitary energy absorbing member structure.

It is advantageous to improve energy management performance of vehicle components. However, it is also advantageous that components of automobiles or other vehicles be light weight to improve fuel efficiency. Thus, vehicle components that exhibit adequate strength during both normal service and under extraordinary conditions such as contact events, while minimizing component weight are advantageous.

SUMMARY

Disclosed herein is a method of manufacturing a unitary energy absorbing structure for a vehicle. The method includes providing a first mold having a cavity defined therein sized to receive a first mandrel and applying a first layer of composite material to at least partially cover the first mold cavity. A second layer of composite material is applied to an outer periphery of the first mandrel and is inserted into the cavity of the first mold.

At least one mandrel segment is inserted in one or more locations in the first mold cavity proximate the first mandrel. The at least one mandrel cooperates with the first mandrel to form a partial length transverse plate of the unitary structure having a stepped height change formed therein. A second mold includes a cavity defined therein sized to receive a second mandrel.

A third layer of composite material is applied to an outer periphery of the second mandrel and the second mandrel is positioned proximate the first mandrel and the at least one mandrel segment. The second mandrel is inserted into the cavity of the second mold to position the second mold adjacent the first mold. The unitary structure is formed from the first layer, second and third layers of composite material by the first mandrel, the at least one mandrel segment and the second mandrel in cooperating with the first mold and the second mold.

In one or more embodiments of the disclosure, a method of manufacturing a unitary energy absorbing structure for a vehicle includes providing a first mandrel, the first mandrel defining an outer periphery and applying a first layer of composite material to at least partially cover the outer periphery of the first mandrel. A second mandrel defining an outer periphery is provided and is positioned proximate to the outer periphery of the first mandrel. A second layer of composite material is applied to at least partially cover the outer periphery of the second mandrel.

The second layer of composite material at least partially covers the outer periphery of the second mandrel and overlaps at least a portion of the first layer of composite material on the outer periphery of the first mandrel. A first mold having a cavity defined therein sized to receive the first mandrel and a second mold having a cavity defined therein sized to receive the second mandrel are provided. The first mandrel is positioned in the first mold cavity and the second mold is positioned in the second mold cavity. The unitary structure is formed from the first layer and the second layer of composite materials with the first mandrel and the second mandrel in the first mold and the second mold.

In one or more embodiments of the disclosure, a method of manufacturing a unitary energy absorbing structure for a vehicle. The method includes providing a first mold having a cavity defined therein sized to receive a first mandrel and applying a first layer of composite material to at least partially cover the first mold cavity. A second layer of composite material is applied to an outer periphery of the first mandrel and is inserted into the cavity of the first mold.

At least one mandrel segment is inserted in one or more locations in the first mold cavity proximate the first mandrel. The at least one mandrel cooperates with the first mandrel to form a partial length transverse plate of the unitary structure having a stepped height change formed therein. A supplemental mandrel sized to cooperate with one or more of the first mandrel and the at least one mandrel segment is provided. A second mold having a cavity defined therein sized to receive a second mandrel is provided.

A third layer of composite material is applied to an outer periphery of the second mandrel, while a fourth layer of composite material is applied to at least partially cover an outer periphery of the supplemental mandrel. The second mandrel is positioned proximate the supplemental mandrel and the at least one mandrel segment and is inserted into the cavity of the second mold to position the second mold adjacent the first mold. The unitary structure is formed from the first layer, the second layer, the third layer and the fourth layer of composite material with the first mandrel, the at least one mandrel segment, the supplemental mandrel and the second mandrel in the first mold and the second mold.

The above features and advantages and other features and advantages of the present disclosure are readily apparent from the following detailed description of the best modes for carrying out the disclosure when taken in connection with the accompanying drawings.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
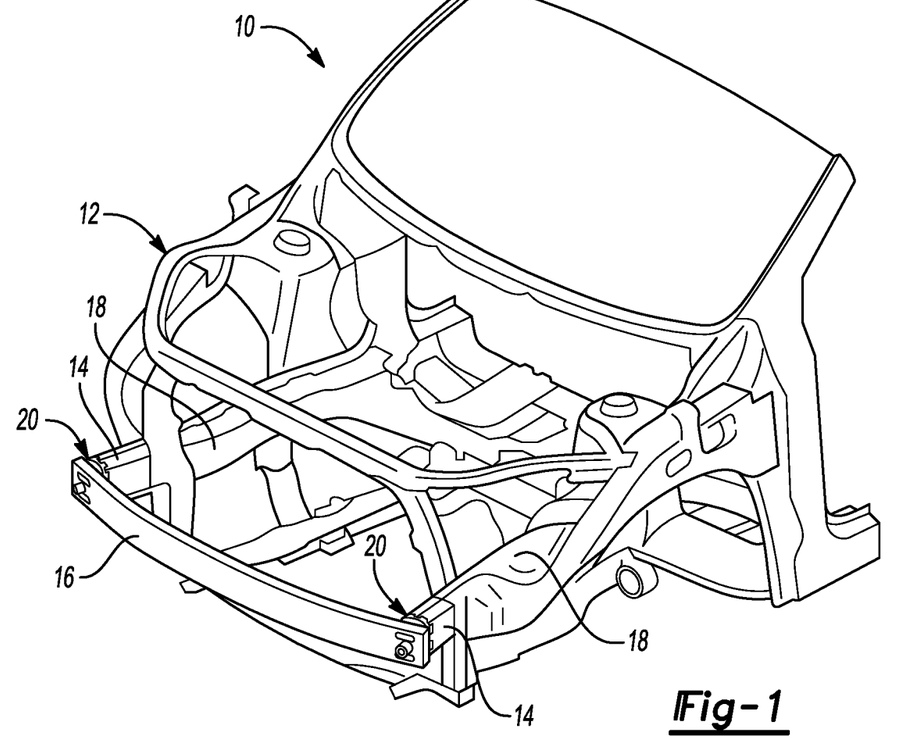
FIG. 1 is a fragmentary perspective view of a vehicle having a body structure including a bumper and energy absorbing assembly including bumper beam attached to at least one energy absorbing member in accordance with one or more embodiments of the disclosure.

Referring to the drawings, wherein like reference numbers refer to like components throughout the views, FIG. 1 shows a portion of an example vehicle 10. The vehicle 10 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device.

While the vehicle 10 of FIG. 1 illustrates a typical example application suitable for the bumper and energy absorbing assembly, generally referenced by 20 and disclosed herein, the present design is not limited to vehicular applications. Any stationary or mobile, machine or manufacture may benefit from use of the present design, when properly scaled and configured for the particular application. For illustrative consistency, the vehicle 10 will be described hereinafter as an example system without limiting use of the bumper and energy absorbing assembly 20 to such an embodiment.

Referring now to FIG. 1, the vehicle 10 includes a body structure 12. The body structure 12 cooperates with the bumper and energy absorbing assembly 20. The bumper and energy absorbing assembly 20 may include at least one energy absorbing member 14 and a bumper beam 16. The at least one energy absorbing member 14 and the bumper beam 16 may be located at a front end of the body structure 12 of the vehicle 10, as shown. Alternatively, the at least one energy absorbing member 14 and the bumper beam 16 of the bumper and energy absorbing assembly 20 may be located at a rear end of the body structure 12 of the vehicle 10.

The body structure 12 may include one or more rails 18. The at least one energy absorbing member 14 may be attached to the rail 18. Alternatively, the at least one energy absorbing member 14 may be a portion of the rail 18 adjacent to the bumper beam 16. The bumper beam 16 may be configured to receive the external force and to distribute the external force to one or more energy absorbing members 14. The at least one energy absorbing member 14 may be configured to absorb energy when the vehicle 10 is subjected to an external force (not shown).

As shown in FIG. 1, the at least one energy absorbing member 14 may include a pair of energy absorbing members 14 disposed adjacent opposing side rails 18 of the body structure 12 that cooperate with opposing ends of the bumper beam 16 to secure the bumper beam 16 to the body structure 12. A first end 40 of the at least one energy absorbing member 14 cooperates with the one or more rails 18 while a second end 42 of the at least one energy absorbing member 14 cooperates with the bumper beam 16. For purposes of clarity, the terms at least one energy absorbing member 14 and energy absorbing member 14 will be used interchangeably in the following portions of the specification. Use of the terms at least one energy absorbing member 14 and energy absorbing member 14 do not provide or import any limitations to this specification.

Figure 2:
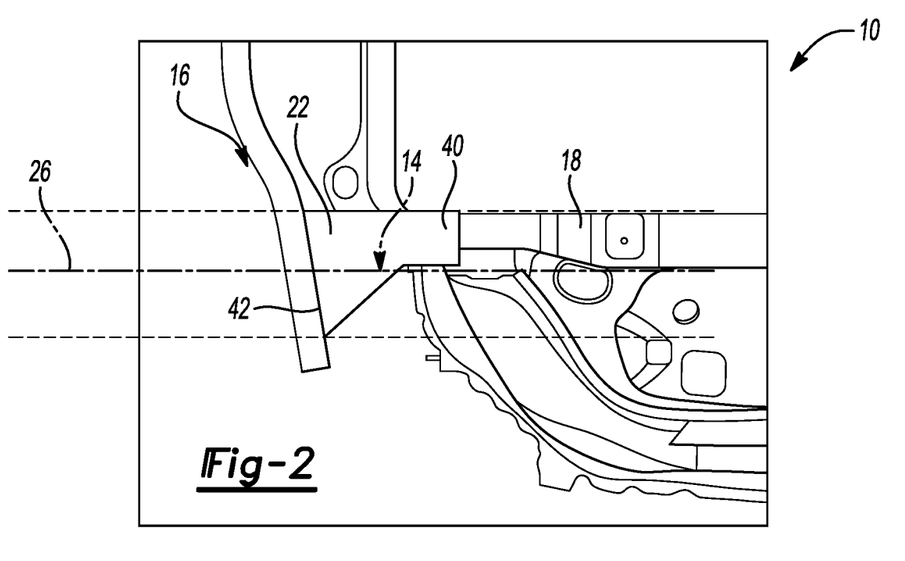
FIG. 2 is a top plan elevation view of the body structure including the bumper and energy absorbing assembly in accordance with one or more embodiments of the disclosure.
Figure 3:
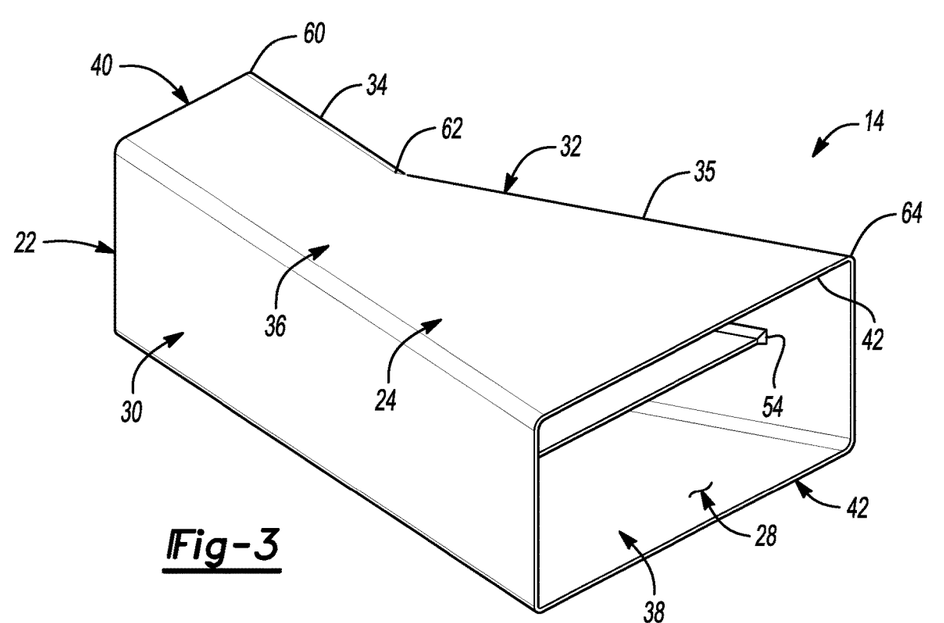
FIG. 3 is a perspective view of an exemplary energy absorbing member for the bumper and energy absorbing assembly in accordance with one or more embodiments of the disclosure.

The energy-absorbing structures or energy absorbing members 14 are used in a vehicle 10 to absorb energy through controlled deformation. The at least one energy absorbing member 14 may include energy absorbing members, such as energy absorbing cans or boxes, attached to a bumper beam 16. Referring additionally to FIGS. 2 and 3, energy absorbing member 14 may include a body 22 having an outer periphery, generally referenced by numeral 24, defined by one or more outer walls. As shown in FIG. 2, the body 22 extends along a longitudinal axis 26. An inner periphery of the body 22, referenced by numeral 28, is defined by and extends between the one or more outer walls 24.

Referring back to FIG. 3, the inner periphery 28 of the body may extend at least partially through the body 22 defined by the outer peripheral walls 24 and generally define a hollow interior of the body. The inner periphery 28 of the body may extend through the body 22 between a first end 40 shown in FIG. 4 and a second end 42 of the body 22 shown in FIG. 5. The energy absorbing member 14 may also include one or more internal plates, generally referenced by numeral 44, which provide structural geometry for reinforcement of the energy absorbing member 14. The amount of energy absorbed by the energy absorbing member 14 is a function of the material and the geometry of the energy absorbing member 14 under energy absorbing load.

Referring now to FIG. 3, one or more exemplary embodiments of the at least one energy absorbing member 14 is described in greater detail. It is appreciated that the at least one energy absorbing member may be formed in a variety of geometries and configurations to accomplish the objectives of the disclosure. The body 22 of the energy absorbing member 14 includes a first sidewall or first wall 30 and an opposing second sidewall or second wall 32.

A top wall or third wall 36 of the energy absorbing member 14 extends between the first wall 30 and the second wall 32, while a bottom wall or fourth wall 38 provided on an opposing side from the third wall 36 extends between the first wall 30 and the sidewall 32. The opposing first and second walls 30, 32 as shown in FIG. 3, in combination with the opposing third and fourth walls 36, 38 extending between the first and second walls 30, 32, cooperate to define the one or more outer or peripheral walls 24 of the body 22 of the energy absorbing member 14 and the inner periphery 28 of the energy absorbing member 14. Additionally, one or more outer peripheral walls 24 of the body cooperate to define a first end 40 and an opposing second end 42.

As shown in FIGS. 2 and 3, the first end 40 of the body 22 of the energy absorbing member 14 is positioned adjacent to and cooperates with the one or more rails 18 of the body structure 12 of the vehicle 10. Further, the second end 42 of the body of energy absorbing member 14 is positioned adjacent to and cooperates with the bumper beam 16. The first end 40 and second end 42 are disposed on opposing portions or sides of the body 22 of the energy absorbing member 14.

Each of the first wall 30, second wall 32, third wall 36 and fourth wall 38 of the energy absorbing member 14 may be formed as a single-piece compression molded structure from a composite having a polymer matrix and a plurality of reinforcing fibers (not shown). At least some of the reinforcing fibers may continuously extend between the first wall 30 and the second wall 32, while at least some of the reinforcing fibers may continuously extend between the third wall 36 and the fourth wall 38.

The energy absorbing member 14 may be constructed from fiber-reinforced composite. Fiber-reinforced composite materials include a polymeric matrix having a reinforcing material distributed therein. Suitable reinforcing materials include, but are not limited to, non-crimp fabric ("NCF") carbon or glass fibers, glass fiber, carbon fiber, aramid fiber, basalt fiber, fiber made from natural products (e.g., hemp, jute, or other bast fibers), high strength polymeric fibers (e.g., high strength polyethylene or high strength polypropylene). The reinforcing materials may be fabricated as woven fabric, continuous random fabric, discontinuous random fibers, chopped random fabric, continuous strand unidirectional plies, oriented chopped strand plies, braided fabric and any combinations thereof. The polymeric matrix may be a thermoplastic polymer or a thermoset polymer. Representative composite materials may include, but are not limited to, discontinuous carbon fiber thermoplastics, discontinuous fiber thermoset prepreg materials or continuous fiber thermoset prepreg materials.

Energy absorbing members 14 are designed to absorb energy in a crash. Metal energy absorbing members absorb energy as molecules slide past one another to deform the component without fracturing. Fiber-reinforced composite energy absorbing members absorb energy through fragmentation, pulverization, fronding, tearing, interlaminar, intralaminar, fiber-matrix debonding, and fiber pullout failure modes, by way of non-limiting example. However, energy absorbing members 14 can potentially detach from the bumper beam 16 during an event, particularly when the energy-absorbing structure is contacted at an angle that is non-parallel to the longitudinal axis of the energy absorbing member 14.

However, in the case of a composite energy absorbing member 14, the energy absorbing member 14 is integrated with the one or more rails 18 and body structure 12 of the vehicle. Thus, while the bumper 16 may separate from the energy absorbing member 14, the integrated energy absorbing member 14 will remain in the path of contact to absorb a maximum amount of energy possible during a contact event based on the material and geometry of the energy absorbing member 14. Fiber-reinforced composite energy absorbing members 14 are lighter in weight than metal energy absorbing members 14. Such lighter weight energy absorbing members 14 may improve vehicle fuel efficiency.

The energy absorbing member 14 may further include a transverse plate or portion 44 disposed within and extending at least partially through the inner periphery 28 of the body 22 of the energy absorbing member 14. The transverse plate 44 may provide structural support to the body 22 by increasing structural stiffness of the energy absorbing member 14, thereby improving energy absorbing performance. The transverse plate 44 may extend between and cooperate with the opposing first and second walls 30, 32 of the body 22 such that it divides the inner periphery 28 into a first compartment defined between the third wall 36 and the transverse plate 44 and a second compartment defined between the fourth wall 38 and the transverse plate 44. In one or more embodiments of the disclosure, the transverse plate 44 may be formed as part of the unitary structure of the energy absorbing member 14 utilizing the same fiber-reinforced composite materials as the energy absorbing member body 22.

The transverse plate 44 may extend at least partially through the inner periphery 28 of the energy absorbing member body 22 from the first end 40 to a region 54 proximate the second end 42 of the energy absorbing member body 22. Limiting the extension of the transverse plate 44 through the inner periphery 28 of the energy absorbing member body 22 reduces the cross-sectional area of the energy absorbing member 14 and thereby, reduces the energy absorbing force transferred to the vehicle 10.

The energy absorbing member 14 illustrated in FIG. 3 is an exemplary configuration of the energy absorbing member geometry variations that may be manufactured utilizing the one or more methods of this disclosure. In the non-limiting example of FIG. 3, the second sidewall or second wall 32 may be formed with a first portion 34 extending generally parallel to and planar with the first wall 30. The first portion 34 extends between a surface 60 of the first end 40 to a junction 62. A second portion 35 of the second wall 32 extends at an oblique angle from the junction 62 of the first portion 34 to a surface 64 on the second end 42 of the body 22. The second portion is non-planar with the first portion 34 of the second wall 32 or the first wall 30. The top wall or third wall 36 and bottom wall or fourth wall 38 extend with the second portion 35 and define the inner periphery 28 of the body 22 therebetween.

Further, the transverse plate 44 may extend along the inner periphery of the second portion 35 of the second wall 30 to the region 54 proximate the opening in the second end 42 of the energy absorbing member body 22. In one non-limiting example of the disclosure, the combination of the oblique geometry of the second portion 35 of the second wall, in combination with the positioning the transverse plate 44 through the inner periphery 28 of the energy absorbing member body 22 reduces the cross-sectional area of the energy absorbing member 14 and the energy absorbing force transferred to the vehicle 10.

Referring now to FIGS. 4A-4F and FIG. 5-8, one or more embodiments of a method of manufacturing an energy-absorbing structure are disclosed. It is understood that the quantity and type of manufacturing components disclosed herein are non-limiting and provided only for exemplary purposes. Further, the types of materials disclosed herein and description of the methodology may be altered or adjusted to accomplish the purposes of this disclosure.

Figure 7:
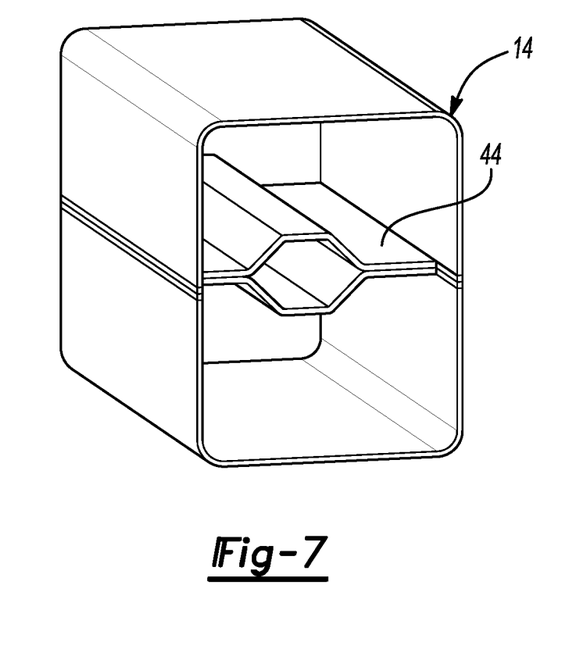
FIG. 7 is perspective view of a unitary, energy-absorbing structure formed in accordance with the exemplary manufacturing process illustrated in FIGS. 4A-4F in accordance with one or more embodiments of the disclosure.

The method of manufacturing an energy-absorbing structure such as the energy absorbing member 14 may include the use of one or more mandrels and one or mold cavities. As is shown in FIG. 5, the one or more mandrels may include a first mandrel 72 sized to be received within a cavity 94 of a first mold 92. The first mandrel 72 may include an outer periphery 74 shaped to define the features of one or more portions of a single piece or unitary energy absorbing member structure 14 as shown in FIG. 7. The outer periphery 74 of the first mandrel 72 may additionally include be formed or shaped to include one or more patterns 76 to be formed in to the energy absorbing member 14. FIG. 5 illustrates that the first mandrel 72 is sized to be positioned in the cavity 94 of the first or lower mold 92.

A second mandrel 78 is provided and sized to be received within a cavity 98 of a second mold 96. As with the first mandrel 72, the second mandrel 78 includes an outer periphery 80 shaped to define the features of a corresponding portion of the unitary energy absorbing member structure 14. The outer periphery 80 of the second mandrel 78 may additionally include be formed or shaped to include one or more patterns 82 to be formed in the energy absorbing member 14. FIG. 5 illustrates the first mandrel 78 is sized to be positioned in the cavity 98 of the second or upper mold 96.

Figure 6:
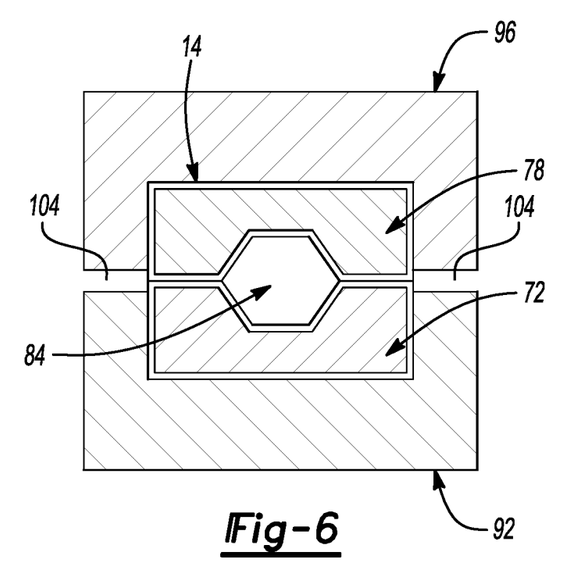
FIG. 6 is a sectional view of the one or more molds and the one or more mandrels for use in connect with the exemplary manufacturing process illustrated in FIGS. 4A-4F in accordance with one or more embodiments of the disclosure.

In the one or more embodiments of the disclosure illustrated in FIG. 5, a supplemental mandrel 84 may be provided. In the non-limiting example illustrated in FIGS. 5 and 6, the outer periphery 86 of the supplemental mandrel is shaped to cooperate and be received within the one or more patterns 76 in the outer periphery 74 of the first mandrel 72 and within the one or more patterns 82 in the outer periphery 80 of the second mandrel 78 when the first mold 92 and second mold 96 are aligned. However it is understood that that objectives of the disclosure may be accomplished without the supplemental mandrel 84 or with a variety of configurations for the first and second mandrels 72, 78 used with the first and second molds 92, 96. The combination of the first mandrel 72, second mandrel 78 and supplemental mandrel 84 are utilized to form the body 22 and transverse plate or portion 44 of the unitary energy absorbing member structure 14 as shown in FIGS. 6 and 7.

Figure 8:
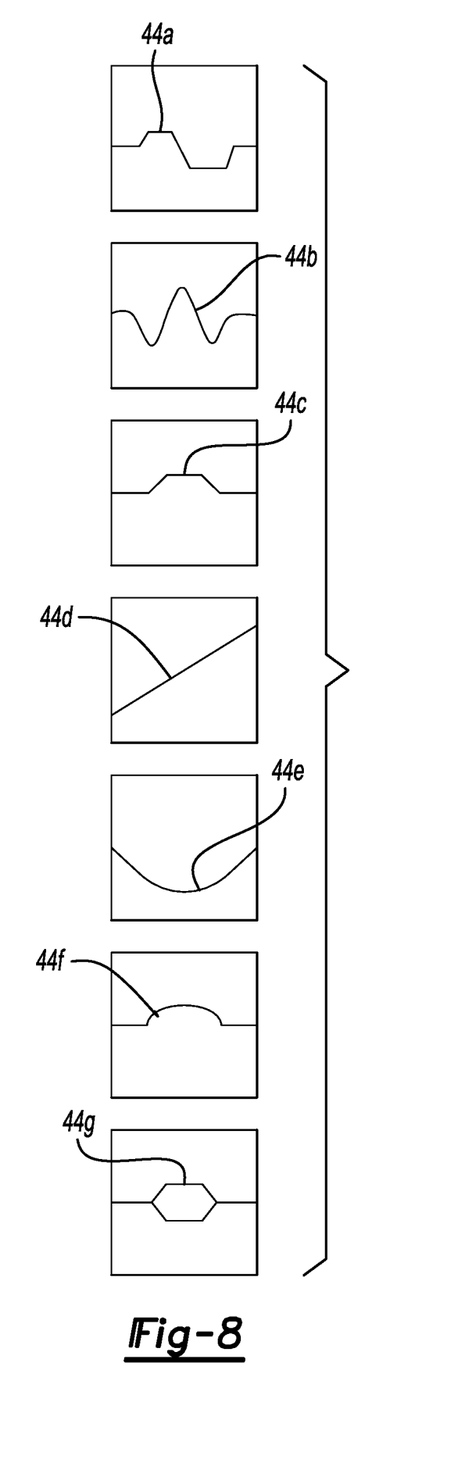
FIG. 8 are plan view illustrations of exemplary interior configurations of the energy absorbing member in accordance with one or more embodiments of the disclosure.

The transverse plate or portion 44 illustrated in FIGS. 3 and 7 may have a substantially planar shape. It is also understood, as is illustrated in FIG. 8, that alternative shapes or geometries for the transverse plate or portion, generally referenced by numbers 44a, 44b, 44c, 44d, 44e, 44f and 44g, may be utilized to accomplish the objectives of this disclosure. The alternative geometries of transverse portion 44a-44g, may be adopted for a variety of purposes, such as to provide additional structural support to the energy absorbing member body, reduction of energy absorbing member weight and/or reduction of materials required to manufacture the unitary energy absorbing member body.

Referring now to FIGS. 4A-4F, a method of forming a unitary energy absorbing member is illustrated in greater detail. In one or more embodiments of the disclosure, this method may utilize composite sheet materials with limited flowability in the molding process but are pliable prior to the molding stage. Representative composite sheet materials may include, but are not limited to, discontinuous carbon fiber thermoplastics, discontinuous fiber thermoset prepreg materials or continuous fiber thermoset prepreg materials.

Figure 4A:
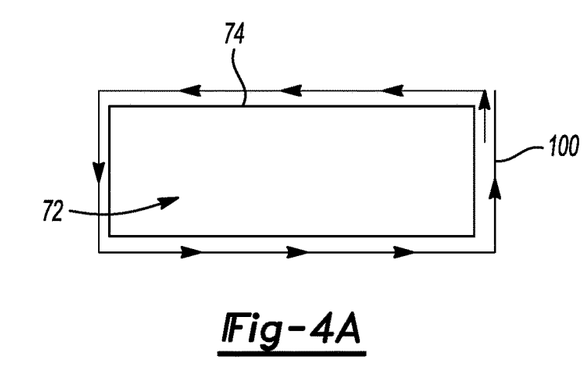
FIGS. 4A-4F illustrate an exemplary manufacturing process for forming a unitary, energy absorbing structure in accordance with one or more embodiments of the disclosure.
Figure 4B:
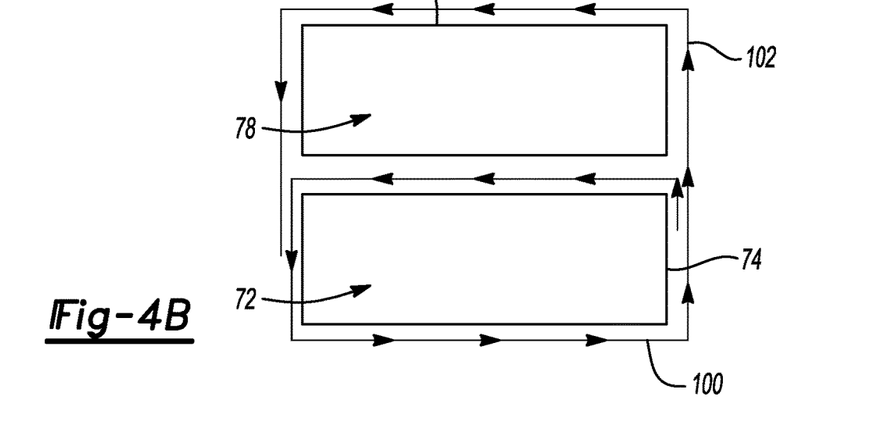

FIG. 4A illustrates the outer periphery 74 of the first mandrel 72 is at least partially covered or wrapped with a first layer of composite material 100. It is contemplated that the first layer of composite material 100 fully envelopes or wraps the outer periphery of the first mandrel 72. FIG. 4B illustrates at least partially covering or wrapping the outer periphery 80 of the second mandrel 78 in a second sheet or layer of composite material 102.

In one or more embodiments, the second mandrel 78 may be positioned proximate the wrapped outer periphery 74 of the first mandrel prior to at least partially covering or wrapping the outer periphery 80 of the second mandrel 78 in the second layer of composite material 102. As shown in FIG. 4B, the second layer of composite material 102 may overlap a portion of the first layer of composite material 100 applied to at least a portion the outer periphery 74 of the first mandrel 72 when the first and second mandrels 72, 78 are aligned.

Referring to FIG. 5, if a supplemental mandrel 84 is utilized, the supplemental mandrel 84 may be positioned between the first and second mandrels 72, 78. It is contemplated that the outer periphery 74 of the first mandrel 70 and the outer periphery 80 of the second mandrel 78 may be fully enveloped or wrapped with the first and second layers of composite materials 100, 102 when the supplemental mandrel 84 is implemented. The outer periphery 86 of the supplemental mandrel 84 is received within the one or more patterns 76 in the outer periphery 74 of the first mandrel 72 and within the one or more patterns 82 in the outer periphery 80 of the second mandrel 78 when the first mandrel 72 and the second mandrel 78 are aligned.

Use of composite materials 100, 102 to wrap the first and second mandrels 72, 78 may be dependent on several factors. If the composite materials are thermoplastics, wrapping of the first and second mandrels 72, 78 in the composite materials 100, 102 may occur if the composite materials 100, 102 are above the material glass transition temperature but below the material melt temperature. The wrapping process may occur while heating the materials 100, 102 in an oven-like environment, or after the heating is complete while the composite materials 100, 102 are still formable prior to entering the first and second molds 92, 96.

In one non-limiting example, the wrapping process may include one or more steps, including heating the thermoplastic first sheet or layer of composite material 100 prior to wrapping the first mandrel 72. Next, the thermoplastic second sheet or layer of composite material 102 may be heated with the wrapped first mandrel 72 prior to wrapping the second mandrel 78. Finally, the wrapped first and second mandrels 72, 78 into the cavities 94, 98 of the first and second molds 92, 96. It is also understood that the wrapping process may be segmented into multiple stages, wherein portions of the outer periphery 74 of the first mandrel 72 may be individually wrapped and heated in individual sections of composite material 100 before applying another section of composite material 100 to the first mandrel 72.

In another non-limiting example, the wrapping process may include one or more steps based upon the use of thermoset prepeg materials as the composite materials 100, 102. With thermoset prepeg materials, the wrapping process for the first mandrel 72 and second mandrel 78 may occur at room temperature or a temperature above the glass transition temperature of the epoxy. The outer periphery 74 of the first mandrel 72 is at least partially covered or wrapped with a thermoset composite material 100 while the outer periphery 80 of the second mandrel 78 is at least partially covered or wrapped in the thermoset composite material 102.

The wrapped first and second mandrels 72, 78 may be partially cured prior to alignment and positioning in the cavities 94, 98 of the first and second molds 92, 96. The partial curing may result from either room temperature cure progression or heating of the thermoset prepreg materials to ease the wrapping process. In yet another non-limiting example, local unidirectional fiber patches may be applied to the first and second mandrels 72, 78. Use of local unidirectional fiber patches may permit the use of a glass fiber structure with unidirectional carbon fiber patches, or inner wrapped layers of glass fiber and outer wrapped layers of carbon fiber. Alternatively, random discontinuous material throughout and local unidirectional tapes or prepregs materials for local property enhancement may be utilized.

Figure 4C:
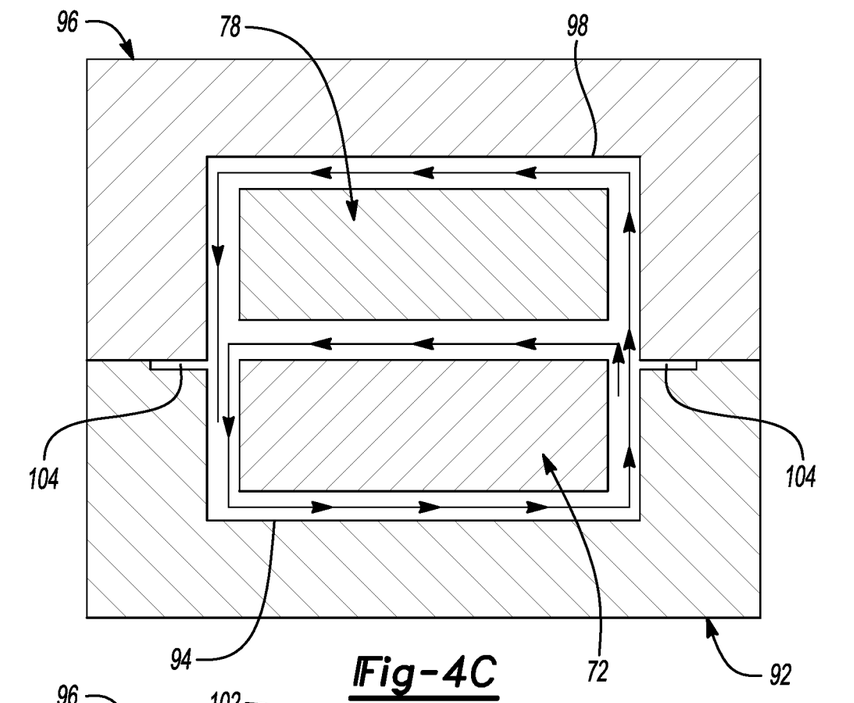
Figure 4D:
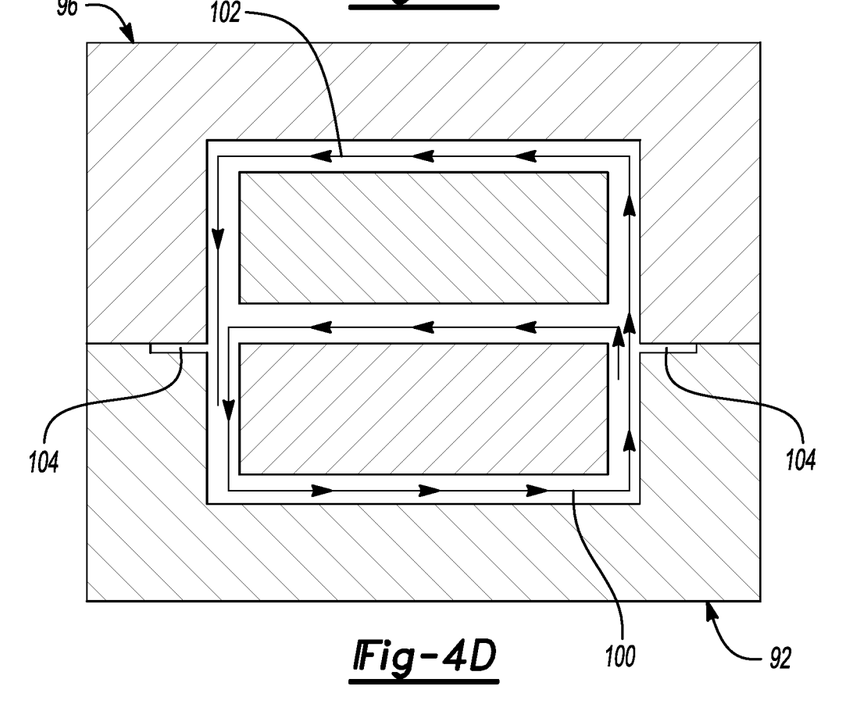
Figures 4E, 4F, 5:
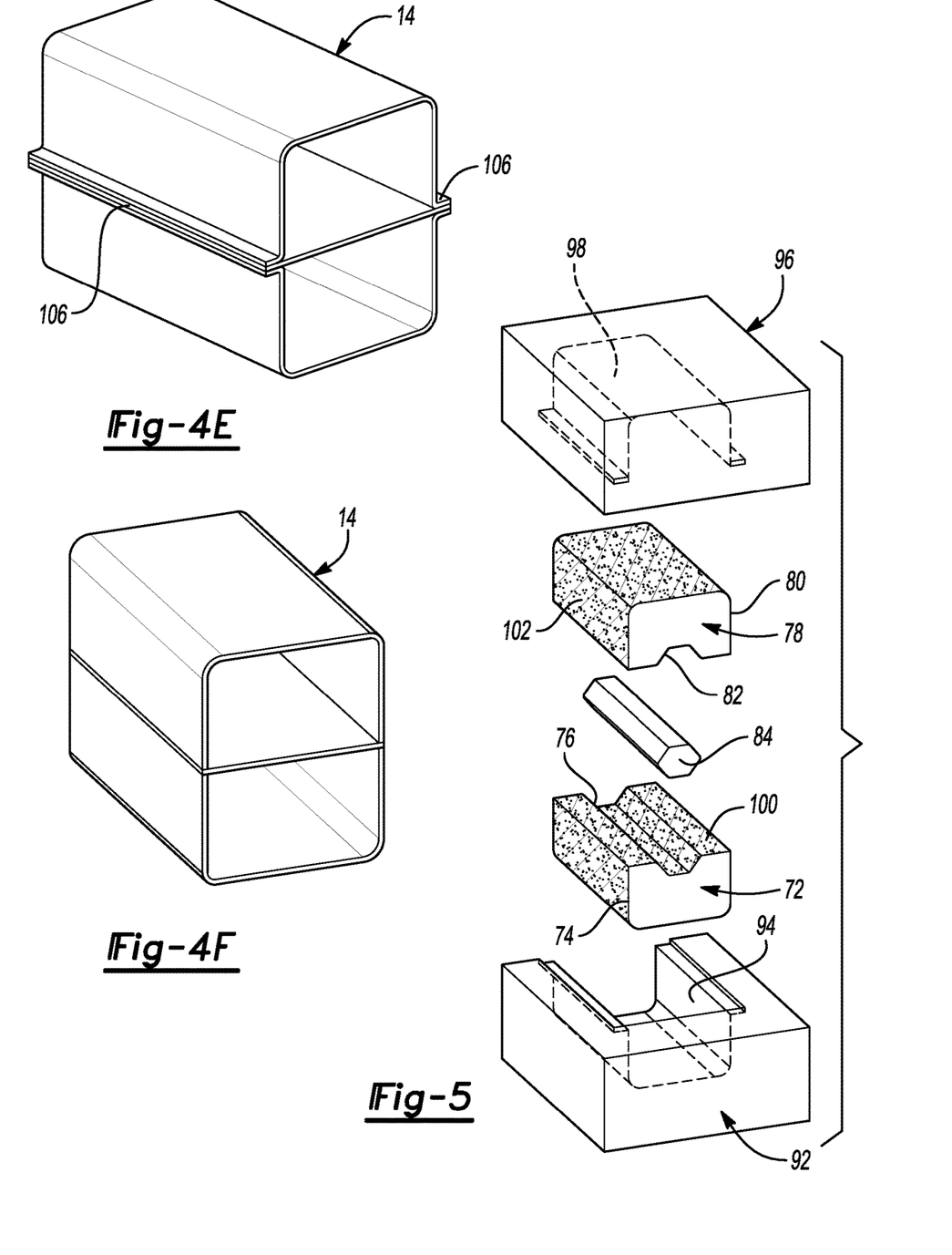
FIG. 5 is an exploded perspective view of one or more molds and one or more mandrels for use in connection with the exemplary manufacturing process illustrated in FIGS. 4A-4F in accordance with one or more embodiments of the disclosure.

Referring now to FIG. 4C, the wrapped first mandrel 72 may be positioned in the cavity 94 of the first mold 92 while the wrapped second mandrel 78 may be positioned in the cavity 98 of the second mold 96. FIG. 4D illustrates the molding or curing process of the composite materials 100, 102 when the first mold 92 and second mold 96 portions are closed and activated. As shown in FIGS. 4C, 4D and 6, at least one of the first mold 92 and the second mold 96 may include one or more channels 104. The channels 104 are sized to receive overflow or overlap composite materials 100, 102 generated during the molding or curing process in FIG. 4D. The channels 104 may assist to create thickness of the layer of composite materials 100, 102 of the unitary structure and overcome molding pressure variations.

FIGS. 4E and 4F illustrate the unitary energy-absorbing structure 14 formed in the process illustrated in FIG. 4D. One or more projections or flanges 106 may extend from the unitary structure 14 following the forming or curing process. Flanges 106 are the resultant of the overflow or overlap composite materials 100, 102 into channels 104 in at least one of the first mold 92 and second mold 96 created in the forming or curing process as shown in FIG. 4D.

The flanges 106 formed from the overlapping region of composite materials 100, 102 increase consolidation area of the composite materials 100, 102, thereby increasing the strength of the unitary structure 104. As illustrated in FIG. 4F, the flanges 106 may be removed from the unitary structure 14 prior to use of the structure 14.

Referring now to FIGS. 9A-9I, another exemplary embodiment of the method of forming an energy-absorbing structure is disclosed. In one non-limiting example, the method of forming the energy-absorbing structure may use a compression molding process with thermoplastic polymeric resins. It is understood that the quantity and type of manufacturing components disclosed herein are non-limiting and provided only for exemplary purposes. Further, the types of materials disclosed herein and description of the methodology may be altered or adjusted to accomplish the purposes of this disclosure.

Figure 9A:
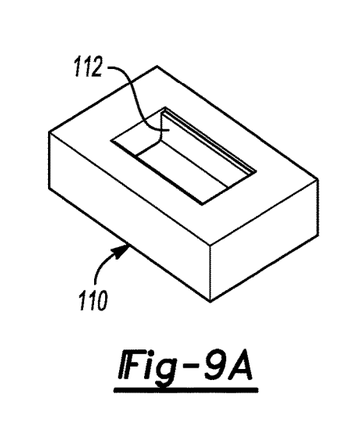
FIGS. 9A-9I illustrate another exemplary manufacturing process for forming a unitary, energy-absorbing structure in accordance with one or more embodiments of the disclosure.
Figure 9B:
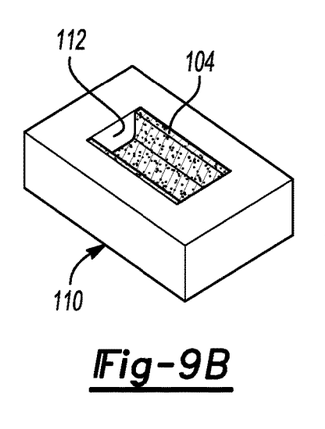

The method of manufacturing an energy-absorbing structure may include the use of one or more mandrels and one or mold cavities. FIG. 9A illustrates a first mold 110 having a cavity 112 formed therein. The cavity 112 may be shaped to define the features of one or more portions of a unitary structure when a first sheet or layer of composite material 104 is placed in the cavity 112 and subjected to the molding process described herein as illustrated in FIG. 9B. As illustrated, the first layer of composite material 104 may at least partially cover or, in the alternative, fully wrap the cavity 112 of the first mold 110.

The first layer 104 may be cut to a desired shape and may include fiber, which may be continuous or discontinuous, and thermoplastic resin. The first layer 104 may be rigid at room temperature. It is contemplated that the first layer 104 may be pre-heated or warmed in an oven prior to the sheet 104 being placed into the cavity 112 of the first mold 110. It is also contemplated that the mold cavity 112 may also be heated prior to placement of the first layer 104 into the cavity 112.

Figure 9C:
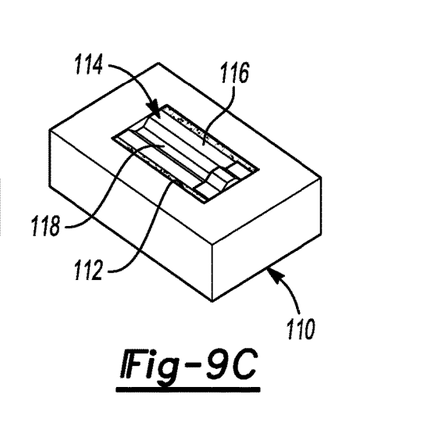
Figure 9D:
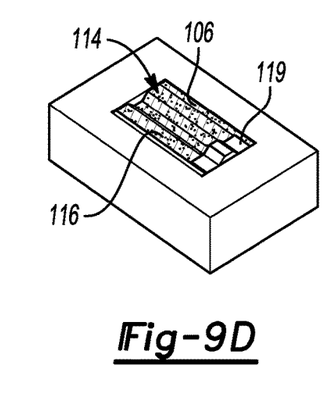

Referring now to FIG. 9C, a first mandrel 114 includes an outer periphery 116 that is sized to be received within cavity 112 of the first mold 110. The outer periphery 116 of the first mandrel 114 may additionally include be formed or shaped to include one or more patterns 118. The outer periphery 116 and the one or more patterns 118 may be used to provide structural elements to one or more components of the unitary structure. FIG. 9D illustrates placement of a second layer or sheet of composite material 106 onto a portion of the outer periphery 116 of the first mandrel 114 to at least partially cover the outer periphery 116 of the first mandrel 114.

As shown in FIG. 9D, at least one mandrel segment 119 may cooperate with the first mandrel 114. The at least one mandrel segment 119 may be provided in one or more locations of the cavity 112 of the first mold 110. As shown in FIG. 9D, the at least one mandrel segment 119 is disposed adjacent one end of the first mandrel 114 and is not covered by the second layer of composite material 106. However, it is understood that the at least one mandrel segment 119 may include a variety of shapes to form geometries into the unitary structure and that a portion of the at least one mandrel segment may be at least partially covered by the second layer of composite material 106.

The at least one mandrel segment 119 will cooperate with other elements, including one or more of the mandrels in the one or more molds, to create a transverse plate having a partial length transverse plate or transverse mid-plate that includes a stepped height change. Limiting the extension of the transverse mid-plate through the inner periphery of the energy absorbing member body adjacent a bumper side of the energy absorbing member reduces the cross-sectional area of the energy absorbing member and thereby, reduces the energy absorbing force transferred to the vehicle 10.

Figure 9E:
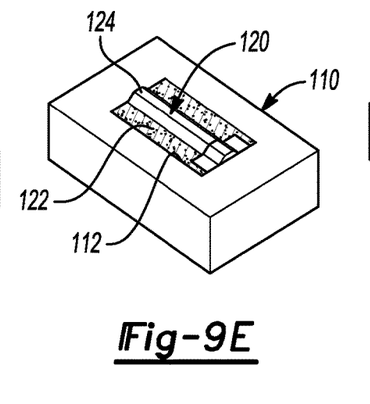
Figure 9F:
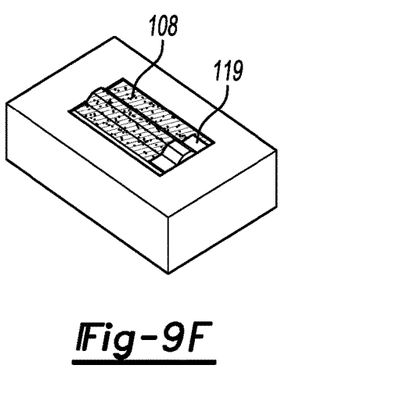
Figure 9G:
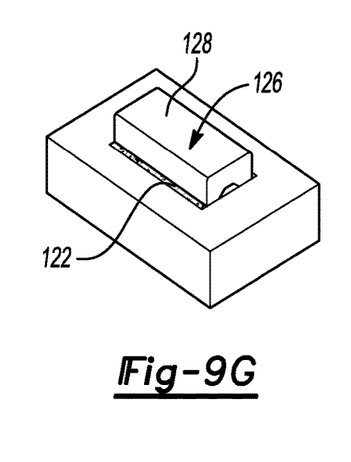
Figure 9H:
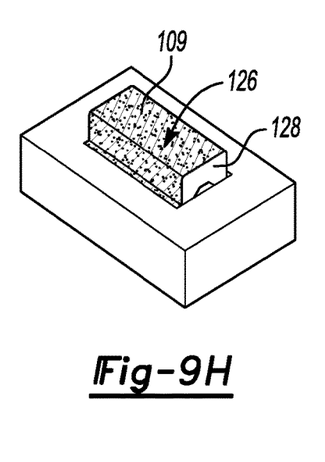

FIG. 9G illustrates positioning and alignment of a second mandrel 126. The second mandrel 126 includes an outer periphery 128 that is positioned proximate the at least partially covered outer periphery 122 of the second mandrel and may additionally include one or more patterns (not shown) formed therein. The second mandrel 120 may be sized to cooperate with the at least one mandrel segment 119. FIG. 9H illustrates placement of a third sheet or layer of composite material 109 that at least partially covers the outer periphery 128 of the second mandrel 126. The third layer of composite material 109 may further extend to at least partially cover the at least one mandrel segment 119.

In one or more embodiments of the disclosure, a supplemental mandrel 120 may be utilized and cooperate with the first mandrel 114, at least one mandrel segment 119 and the second mandrel 128 to form the transverse plate of the unitary structure. Referring now to FIG. 9E, the supplemental mandrel 120 includes an outer periphery 122 shaped to define the features of a corresponding portion of the unitary structure. The outer periphery 122 of the supplemental mandrel 120 may additionally include be formed or shaped to include one or more patterns 124 to be formed in unitary structure. The outer periphery 122 of the supplemental mandrel 120 is sized to align and cooperate with the one or more patterns in the outer periphery of the first mandrel (not shown) in the cavity 112 of the first mold 110.

The supplemental mandrel 120 may be sized to cooperate with the at least one mandrel segment 119. It is understood that the supplemental mandrel 120 may be utilized as shown in FIG. 9E to support formation of the transverse plate of the unitary structure. However, it is also appreciated that the unitary structure may be formed between the first mandrel 114, the at least one mandrel segment 119 and the second mandrel 126 without use of the supplemental mandrel 120.

FIG. 9F illustrates placement of a third sheet or layer of composite material 108 onto a portion of the outer periphery of the supplemental mandrel (not shown). As is shown in FIG. 9F, the third layer of composite material 108 at least partially covers the supplemental mandrel. The third layer of composite material 108 as shown in FIG. 9F does not overlap or cover the at least one mandrel segment 119.

However, it is understood that the at least one mandrel segment 119 may include a variety of shapes to form geometries into the unitary structure and that a portion of the at least one mandrel segment may be at least partially covered by the third layer of composite material 108. The at least one mandrel segment 119 possesses a stepped height change such that the third layer of composite material 108, when molded, conforms to the supplemental mandrel and a partial length mid-plate is achieved. It is also possible to utilize a flowable material in the mid-plate where the volume of material does not fully fill the cavity associated with the mid-plate, therefore achieving a partial length mid-plate.

Figure 9I:
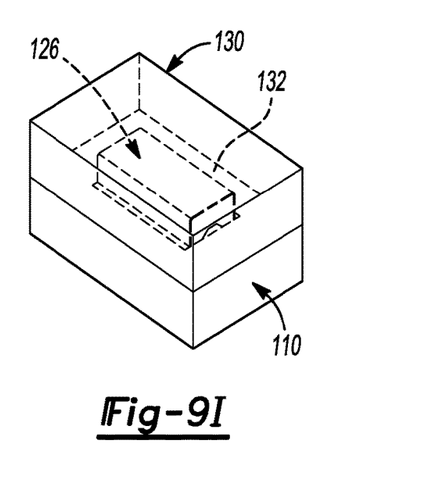

Referring now to FIG. 9I, a second mold 130 is positioned adjacent the first mold 110. The second mold 130 includes a cavity 132 sized to be receive the second mandrel 126. The molding or curing process of the layers of composite materials 104, 106, 108, 109 to form the unitary structure occurs when the first mold 110 and second mold 130 are closed and activated to press the materials into a desired shape of the unitary structure.

It is appreciated that the process set forth and illustrated in FIGS. 9A-9I may be modified to accomplish the objectives of the disclosure. In one non-limiting example, the unitary structure may be formed without a second mandrel, whereby the first mandrel and supplemental mandrel cooperate with the first mold and second mold to form the unitary structure.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of manufacturing an energy absorbing unitary structure for a vehicle comprising:
   providing a first mold having a cavity defined therein sized to receive a first mandrel;
   applying a first layer of composite material to at least partially cover the first mold cavity;
   inserting the first mandrel into the cavity of the first mold;
   applying a second layer of composite material to an outer periphery of the first mandrel;
   inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
   providing a second mold having a cavity defined therein sized to receive a second mandrel;
   applying a third layer of composite material to an outer periphery of the second mandrel;
   positioning the second mandrel to cooperate with the first mandrel and the at least one mandrel segment;
   inserting the second mandrel into the cavity of the second mold to position the second mold adjacent the first mold;
   forming the unitary structure from the first layer, the second layer and the third layer of composite material with the first mandrel, the at least one mandrel segment and the second mandrel in the first mold and the second mold; and
   wherein the transverse plate extends through the inner periphery a distance less than a length of the unitary structure, the length being defined from a first end to a second end of the unitary structure.

2. The method of claim 1 wherein the outer periphery of the first mandrel further comprises one or more patterns used to provide structural elements to the unitary structure.

3. The method of claim 1 wherein the outer periphery of the second mandrel further comprises one or more patterns used to provide structural elements to the unitary structure.

4. The method of claim 1 further comprising providing a supplemental mandrel sized to cooperate with one or more of the first mandrel, the at least one mandrel segment and the second mandrel.

5. The method of claim 4 further comprising applying a fourth layer of composite material to at least partially cover an outer periphery of the supplemental mandrel, wherein the fourth layer of composite material is molded with the first layer, the second layer and the third layer to form the unitary structure.

6. The method of claim 4 wherein the outer periphery of the supplemental mandrel further comprises one or more patterns used to provide structural elements to the unitary structure.

7. The method of claim 5 wherein applying composite materials used for the first layer, second layer, third layer and fourth layer further comprises applying a thermoplastic fiber reinforced composite.

8. The method of claim 5 wherein applying composite materials used for the first layer, second layer, third layer and fourth layer further comprises applying a thermoset fiber reinforced composite.

9. The method of claim 4 further comprising providing an external circumferential surface of the supplemental mandrel with a hexagonal shape.

10. The method of claim 9 wherein the supplemental mandrel at least partially forms the transverse plate to include the hexagonal shape.

11. The method of claim 4 further comprising providing an external circumferential surface of the supplemental mandrel with one or more corners such that the supplemental mandrel at least partially forms a cross-section of the transverse plate to include the one or more corners.

12. The method of claim 1 wherein the at least one mandrel segment cooperates with the first mandrel such that the transverse plate extends substantially through an entirety of the inner periphery.

13. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold;
forming the unitary structure from the first layer, the second layer and the third layer of composite material with the first mandrel, the at least one mandrel segment and the second mandrel in the first mold and the second mold; and
wherein the at least one mandrel segment cooperates with the first mandrel such that the transverse plate extends a first length through the inner periphery, the first length being less than a second length of the inner periphery, the second length extending from a first distal end to a second distal end of the unitary structure.

14. The method of claim 13 wherein the transverse plate is planar throughout.

15. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold;
forming the unitary structure from the first layer, the second layer and the third layer of composite material with the first mandrel, the at least one mandrel segment and the second mandrel in the first mold and the second mold;
providing a supplemental mandrel sized to cooperate with one or more of the first mandrel, the at least one mandrel segment and the second mandrel; and
providing an external circumferential surface of the supplemental mandrel with a hexagonal shape such that the supplemental mandrel at least partially forms a cross-section of the transverse plate to include the hexagonal shape.

16. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold;
forming the unitary structure from the first layer, the second layer and the third layer of composite material with the first mandrel, the at least one mandrel segment and the second mandrel in the first mold and the second mold;
providing a supplemental mandrel sized to cooperate with one or more of the first mandrel, the at least one mandrel segment and the second mandrel; and
providing an external circumferential surface of the supplemental mandrel with a circular shape such that the supplemental mandrel at least partially forms a cross-section of the transverse plate to include the circular shape.

17. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold;
forming the unitary structure from the first layer, the second layer and the third layer of composite material with the first mandrel, the at least one mandrel segment and the second mandrel in the first mold and the second mold;
providing a supplemental mandrel sized to cooperate with one or more of the first mandrel, the at least one mandrel segment and the second mandrel; and
providing an external circumferential surface of the supplemental mandrel with a rectangular shape such that the supplemental mandrel at least partially forms a cross-section of the transverse plate to include the rectangle shape.

18. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting at least one mandrel segment in one or more locations in the first mold cavity to cooperate with the first mandrel, wherein the at least one mandrel segment cooperates with the first mandrel to form a partial length transverse plate of the unitary structure, the transverse plate extending between and cooperating with opposing first and second walls of the unitary structure to divide an inner periphery of the unitary structure into a first compartment defined between a third wall and the transverse plate and a second compartment defined between a fourth wall and the transverse plate;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold;
forming the unitary structure from the first layer, the second layer and the third layer of composite material with the first mandrel, the at least one mandrel segment and the second mandrel in the first mold and the second mold;
providing a supplemental mandrel sized to cooperate with one or more of the first mandrel, the at least one mandrel segment and the second mandrel; and
providing an external circumferential surface of the supplemental mandrel with a triangular shape such that the supplemental mandrel at least partially forms a cross-section of the transverse plate to include the triangular shape.

19. A method of manufacturing an energy absorbing unitary structure for a vehicle comprising:
providing a first mold having a cavity defined therein sized to receive a first mandrel;
applying a first layer of composite material to at least partially cover the first mold cavity;
inserting the first mandrel into the cavity of the first mold;
applying a second layer of composite material to an outer periphery of the first mandrel;
inserting a supplemental mandrel to cooperate with the first mandrel to form a partial length transverse plate of the unitary structure, wherein an external circumferential surface of the supplemental mandrel has a hexagonal shape such that the supplemental mandrel at least partially forms a cross-section of the transverse plate to include the hexagonal shape;
providing a second mold having a cavity defined therein sized to receive a second mandrel;
applying a third layer of composite material to an outer periphery of the second mandrel;
positioning the second mandrel to cooperate with the first mandrel and the at least one mandrel segment;
inserting the second mandrel into the cavity of the second mold to position the second mold adjacent the first mold; and
forming the unitary structure from the first layer, the second layer and the third layer of composite material with the first mandrel, the at least one mandrel segment and the second mandrel in the first mold and the second mold.

* * * * *